(No Model.)

J. W. KEENEY.
ORANGE GRADER.

No. 374,680. Patented Dec. 13, 1887.

Witnesses.
A. Ruppert.
W. V. Burris

Inventor.
J. W. Keeney
Per
Thomas P. Simpson
Atty

UNITED STATES PATENT OFFICE.

JOHN W. KEENEY, OF RIVERSIDE, CALIFORNIA, ASSIGNOR, BY MESNE ASSIGNMENTS, TO D. B. H. POWER AND S. W. POWER, BOTH OF MARBLEHEAD, MASSACHUSETTS.

ORANGE-GRADER.

SPECIFICATION forming part of Letters Patent No. 374,680, dated December 13, 1887.

Application filed March 14, 1887. Serial No. 230,798. (No model.)

*To all whom it may concern:*

Be it known that I, JOHN W. KEENEY, a citizen of the United States, residing at Riverside, in the county of San Bernardino and State of California, have invented certain new and useful Improvements in Orange-Graders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of this invention is to improve the orange-grader described in my patent, No. 348,128, of August 24, 1886.

Figure 1:
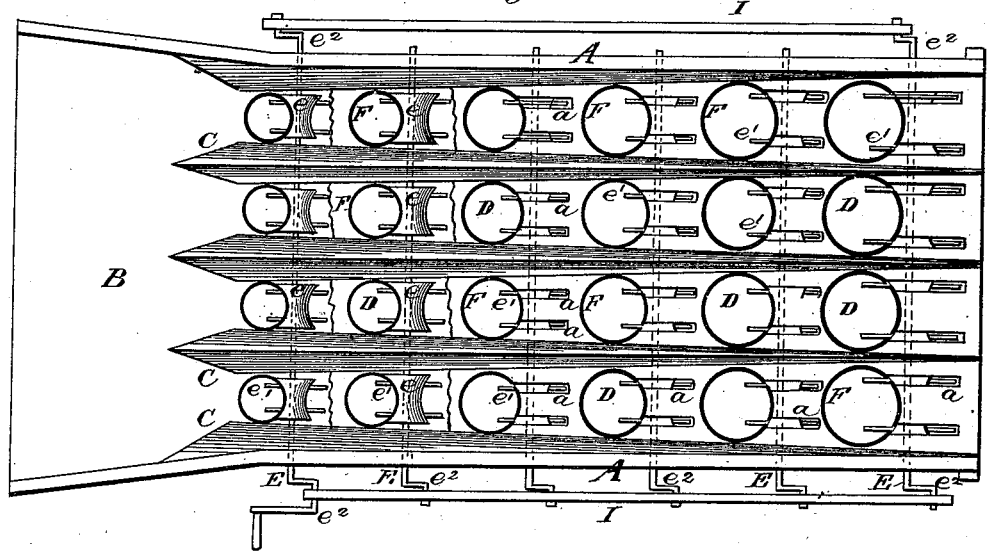
Figure 2:
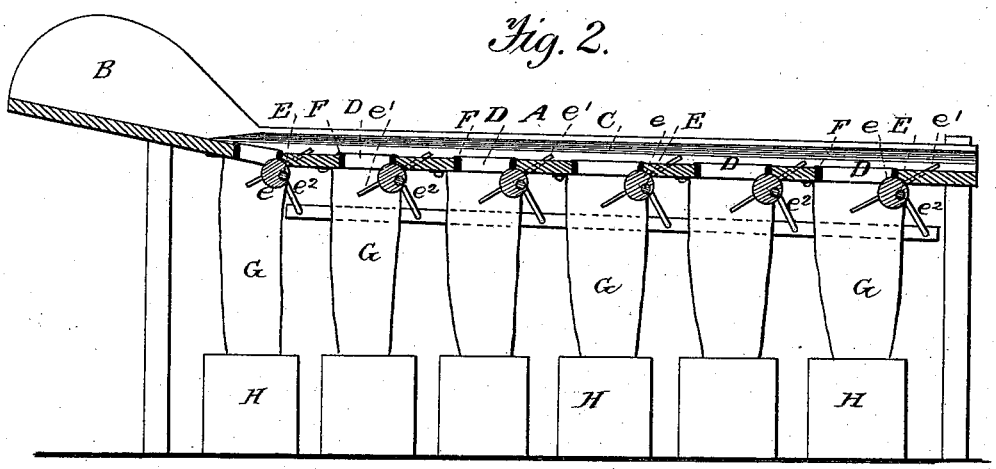
Figure 3:
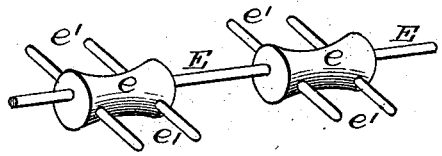

Figure 1 of the drawings is a plan view of my improved grader; Fig. 2, a longitudinal sectional elevation, and Fig. 3 a detail perspective view of one of the crank-shafts with its appendages.

In the drawings, A represents the table, raised upon suitable supports so as to incline from the hopper B to the lower end. This table is divided on its upper surface by the longitudinal partitions C, and between these are arranged the holes D, which are made to gradually increase in diameter and circumference from the upper to the lower end.

The oranges or other fruit or vegetables which are to be graded are poured into the hopper B, from whence they roll down the table between the partitions C. The smallest drop through the first holes, the next in size through the next holes, and so on, those larger than the last holes rolling off the end of the table. Some of the oranges will lodge in the holes, and it is my object to pass them along at once, and for that purpose I arrange in rear of each transverse row of holes a rotary shaft, E, carrying a concave block, $e$, with the diametrically-opposite arms $e'$ $e'$ and the end crank, $e^2$. These arms $e'$ pass through slots $a$ $a$, and as the shaft turns raise the fruit detained in the holes and pass it along to the next, which is larger, until the oranges reach one through which they pass, or drop over the end.

The holes are provided with the rubber lining F, so as to prevent bruising, and the arms $e'$ are likewise covered with rubber.

The concave blocks E are partially under the holes and placed eccentrically on the shafts, so that the fruit is lifted before the pins touch and fully push it out.

G are tubular bags or guides which conduct the fruit to the boxes H, arranged to receive it.

The end shaft nearest to the hopper is provided with a hand-crank, the shafts being all connected on each side by a rod, I.

What I claim as new, and desire to protect by Letters Patent, is—

1. In an orange-grader, the combination of rotary shafts E, carrying arms $e'$ $e'$, and a table having graduated holes D, connecting with slots $a$ $a$, whereby the said arms may revolve through said slots and pass the fruit from one hole to another, as described.

2. In an orange-grader, the combination of a table having graduated holes D, and the shafts E, having concave blocks $e$, arranged partly under the holes and eccentrically on the shafts, as and for the purpose set forth.

3. The table A, having partitions C, hopper B, rubber-lined holes D, and slots $a$, in combination with the crank-shafts having concave blocks and rubber-covered pins, substantially as described.

In testimony whereof I affix my signature in presence of two witnesses.

JOHN W. KEENEY.

Witnesses:
CLARENCE STEWART,
URBAN ALGUIRE.